United States Patent
Lee et al.

(10) Patent No.: US 6,930,742 B2
(45) Date of Patent: Aug. 16, 2005

(54) LIQUID CRYSTAL DISPLAY DEVICE AND METHOD OF FABRICATING THE SAME

(75) Inventors: Joun-Ho Lee, Gyeongsangnam-Do (KR); Tae-Woon Ko, Gyeongsangbuk-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 48 days.

(21) Appl. No.: 10/648,520

(22) Filed: Aug. 27, 2003

(65) Prior Publication Data
US 2004/0041973 A1 Mar. 4, 2004

(30) Foreign Application Priority Data
Sep. 4, 2002 (KR) .................. 10-2002-0053312

(51) Int. Cl.$^7$ .................. G02F 1/1343; G02F 1/1339
(52) U.S. Cl. .................. 349/143; 349/153
(58) Field of Search .................. 349/153, 190, 349/143, 139, 149, 43

(56) References Cited

U.S. PATENT DOCUMENTS

| | | | | |
|---|---|---|---|---|
| 5,285,300 A | * | 2/1994 | Suzuki et al. .................. 349/187 |
| 5,285,301 A | * | 2/1994 | Shirahashi et al. .......... 349/143 |
| 5,982,470 A | | 11/1999 | Nakahara et al. | |
| 5,995,189 A | | 11/1999 | Zhang | |
| 6,172,732 B1 | | 1/2001 | Hayakawa et al. | |
| 6,373,544 B1 | * | 4/2002 | Hirabayashi .................. 349/149 |
| 6,587,160 B2 | * | 7/2003 | Lee et al. ....................... 349/40 |
| 6,862,069 B2 | * | 3/2005 | Kwak et al. .................. 349/143 |

* cited by examiner

Primary Examiner—Tarifur R. Chowdhury
Assistant Examiner—Mike Qi
(74) Attorney, Agent, or Firm—Heller Ehrman LLP

(57) ABSTRACT

A liquid crystal display device includes first and second substrates having an active region, data and gate pad portions, and gate and data link portions, a sealant pattern within a sealant region, at least one first dummy pattern provided between adjacent ones of the gate link portions, at least one second dummy pattern provided between adjacent ones of the data link portions, and a liquid crystal layer between the first and second substrates, wherein a width of each of the first and second dummy patterns is less than a width of the sealant pattern.

14 Claims, 7 Drawing Sheets

LIQUID CRYSTAL DISPLAY DEVICE AND METHOD OF FABRICATING THE SAME

The present invention claims the benefit of Korean Patent Application No. 53312/2002 filed in Korea on Sep. 4, 2002, which is hereby incorporated by reference.

BACKGROUND OF THE INVENTION

1. Field of the Invention

The present invention relates to a display device and a method of fabricating a display device, and more particularly, to a liquid crystal display device and a method of fabricating a liquid crystal display device.

2. Description of the Related Art

In general, a liquid crystal display (LCD) device displays images corresponding to video signals on a liquid crystal display panel using liquid crystal cells arranged in a matrix configuration to adjust light transmission ratios according to the video signals. Accordingly, the liquid crystal cells are arranged in an active matrix form and are driven using integrated circuits (ICs). The driving ICs are commonly fabricated as an IC chip and are mounted on a tape carrier package (TCP) in case of a tape automated bonding (TAB) method, or the ICs are mounted on a surface of the liquid crystal display panel in case of a chip-on-glass (COG) method. In the TAB method, the driving ICs are electrically connected with a pad portion disposed on the liquid crystal display panel by the TCP.

FIG. 1 is a plan view of a liquid crystal display panel according to the related art. In FIG. 1, a liquid crystal display panel includes an active region 10 in which liquid crystal cells are aligned in a matrix configuration, and a gate pad portion 6 and a data pad portion 8 are positioned along a marginal region of a lower substrate 2. The marginal region of the lower substrate 2 does not overlap with an upper substrate 4, and the gate and data pad portions are connected with gate lines 1 and data lines 5, respectively. In the active region 10 of the lower substrate 2, the data lines 5 receive video signals and the gate lines 1 receive gate signals are positioned to cross each other. In addition, a thin film transistor (TFT) for switching the liquid crystal cells and a pixel electrode that is connected to the TFT for driving the liquid crystal cell are formed at the intersection of the gate and data lines 1 and 5. Although not shown, a black matrix, color filters, and a common electrode are formed on the upper substrate 4.

Then, the upper substrate 4 and the lower substrate 2 are attached by a sealant pattern coated within a sealant region 12 that is positioned along a perimeter of the active region 10. Accordingly, a predetermined cell gap is formed between the upper substrate 4 and the lower substrate 2 having a height equivalent to the sealant pattern. Next, liquid crystal material is filled into the predetermined cell gap. In addition, spacers may be included within the predetermined cell gap before injection of the liquid crystal material.

FIG. 2 is a partially enlarged view of a gate link region of FIG. 1 according to the related art, and FIG. 3 is a cross sectional view along I–I' of a sealant region in FIG. 2 according to the related art. In FIGS. 2 and 3, a gate link portion 15 extends from a gate pad portion 14 and includes a gate link electrode 16. Disposed above the gate link electrode 16 are a gate insulating layer 22, an amorphous silicon layer 24, an $n^+$ doped silicon layer 26 ($n^+$ layer), and a passivation layer 28.

The gate link electrode 16 is integrally formed with the gate pad 14 and gate line (not shown) by patterning gate metal materials deposited on the transparent substrate 20. Then, the gate insulating layer 22, the amorphous silicon layer 24, and the $n^+$ layer 26 are sequentially deposited, and the $n^+$ layer is patterned. Next, the passivation layer 28 is sequentially deposited thereon. Then, in order to prevent electrical shorting and interaction by the amorphous silicon layer 24 between the gate pad portion 14 and the gate link portion 15, the gate insulating layer 22, the amorphous silicon layer 24, the $n^+$ layer 26 and the passivation layer 28 are simultaneously etched to expose a portion EA of the transparent substrate 20.

Next, the sealant pattern 30 is coated along a direction crossing the gate link portion 15. Since stepped portions are created within the exposed portions EA of the transparent substrate, a uniform cell gap cannot be obtained by the sealant pattern 30.

FIG. 4 is a partially enlarged view of a data link region in FIG. 1 according to the related art, and FIG. 5 is a cross sectional view along II–II' of the sealant region in FIG. 2 according to the related art. In FIGS. 4 and 5, a data link portion 33 extends from a data pad portion 32 and includes a gate insulating layer 22. In addition, the data link portion 33 includes an amorphous silicon layer 24, an $n^+$ layer 26, a data link electrode 34, and a passivation layer 28.

After sequentially depositing the gate insulating layer 22 on a transparent substrate 20, the amorphous silicon layer 24 and the $n^+$ layer 26 are deposited on the gate insulating layer 22. Then, the $n^+$ layer is patterned and data metal materials are deposited thereon. Next, the data link electrode 34 is integrally formed with the data line and the data pad 32 by patterning the data metal materials. Then, the passivation layer 28 is formed over the data link electrode 34.

In order to prevent electrical shorting and interaction by the amorphous silicon layer 24 between the data pad portion 32 and the data link portion 33, the gate insulating layer 22, the amorphous silicon layer 24, the $n^+$ layer 26, and the passivation layer 28 are simultaneously etched to expose a portion EA of the transparent substrate 20. Then, a sealant pattern 30 is coated along a direction crossing the data link portion 33. Accordingly, since stepped portions are created within the exposed portions EA of the transparent substrate 20, a uniform cell gap cannot be obtained by the sealant pattern 30.

FIG. 6 is a cross sectional view along III–III' of a liquid crystal injecting side in FIG. 1 according to the related art. In FIG. 6, a liquid crystal injecting side in which a plurality of signal lines, such as common electrode lines and the like, are positioned includes the gate metal layer 16, the gate insulating layer 22, the amorphous silicon layer 24, the $n^+$ layer 26, and the passivation layer 28, wherein the sealant pattern 30 is coated on the passivation layer 28.

Accordingly, the stepped portions that exist in the exposed portions EA of the transparent substrate 20 do not exist in the liquid crystal injecting side that is positioned at the opposite side of the link region. Thus, the sealant pattern coated on the link region has a height lower than a height of the sealant pattern coated on the liquid crystal injecting side of the etching region having a step. As a result, since the height of the sealant pattern is different according to the position of the LCD device, the cell gap is not uniform and accordingly, brightness is not uniform. Therefore, dummy patterns may be provided among gate link portions and data link portions on which the sealant pattern is coated, thereby preventing non-uniformity in brightness.

FIG. 7 is a plan view a liquid crystal display device according to the related art. In FIG. 7, a liquid crystal display panel is divided into an active region "A" and a sealant region "S", and cell gaps are uniformly formed by having a dummy pattern 9 larger than a width of a sealant pattern 30 within the region where the sealant pattern is coated. However, as the dummy pattern 9 is formed wider than the width of the sealant pattern 30, the dummy pattern 9 provides a passage through which sealant material 11, which is not hardened, flows into the active region "A". Accordingly, the sealant material 11 that flows into the active region "A" through the dummy pattern 9 reacts with the liquid crystal material and generates spots on a display screen.

SUMMARY OF THE INVENTION

Accordingly, the present invention is directed to a liquid crystal display device and a method of fabricating a liquid crystal display device that substantially obviates one or more of the problems due to limitations and disadvantages of the related art.

An object of the present invention is to provide a liquid crystal display device having improved image definition quality.

Another object of the present invention is to provide a method of fabricating a liquid crystal display device having improved image definition quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates having an active region, data and gate pad portions, and gate and data link portions, a sealant pattern within a sealant region, at least one first dummy pattern provided between adjacent ones of the gate link portions, at least one second dummy pattern provided between adjacent ones of the data link portions, and a liquid crystal layer between the first and second substrates, wherein a width of each of the first and second dummy patterns is less than a width of the sealant pattern.

In another aspect, a liquid crystal display device includes first and second substrates having an active region, data and gate link portions, and a sealant region, at least one first dummy pattern on the first substrate disposed between adjacent ones of the data link portions, at least one second dummy pattern on the first substrate disposed between adjacent ones of the gate link portions, a sealant pattern within the sealant region completely covering the dummy pattern, and a liquid crystal layer between the first and second substrates, wherein the first dummy pattern is substantially identical to the data link portions, and the second dummy pattern is substantially identical to the gate link portions.

In another aspect, a method of fabricating a liquid crystal display device includes providing first and second substrates having an active region, gate and data link portions, and a sealant region, forming a first dummy pattern within the sealant region between adjacent ones of the gate link portions, forming a second dummy pattern within the sealant region between adjacent ones of the data link portions, forming a sealant pattern within the sealant region to cover the first and second dummy patterns, and attaching the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
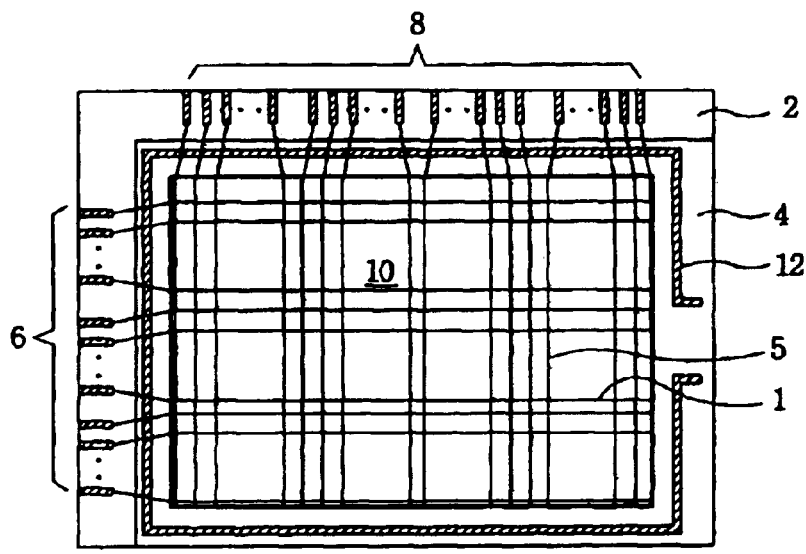
FIG. 1 is a plan view of a liquid crystal display panel according to the related art.
Figure 2:
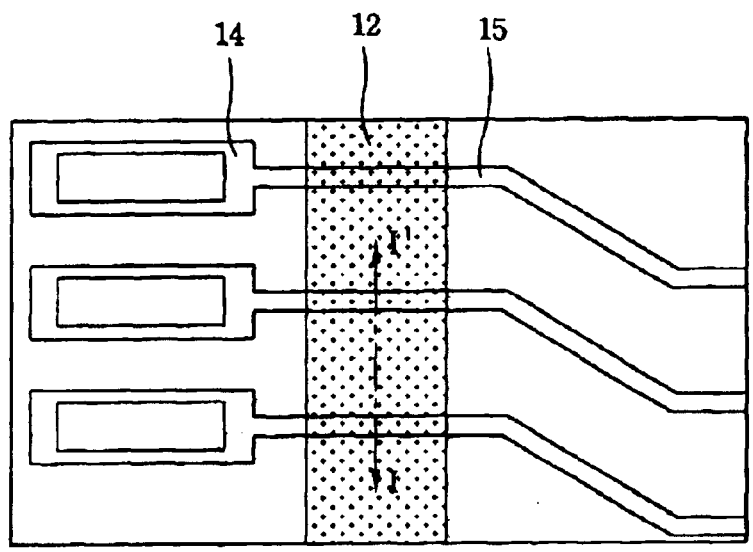
FIG. 2 is a partially enlarged view of a gate link region of FIG. 1 according to the related art.
Figure 3:
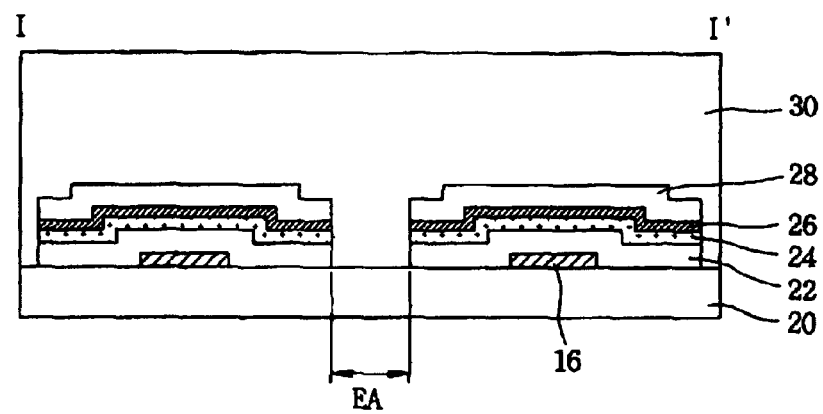
FIG. 3 is a cross sectional view along I–I' of a sealant region in FIG. 2 according to the related art.
Figure 4:
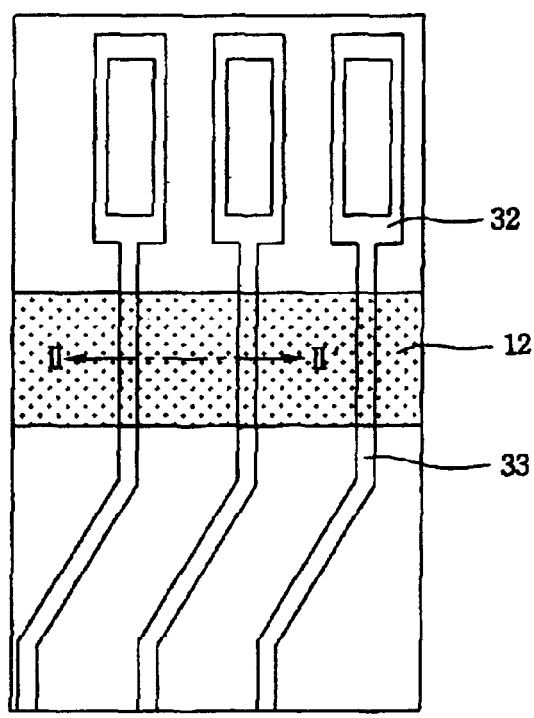
FIG. 4 is a partially enlarged view of a data link region in FIG. 1 according to the related art.
Figure 5:
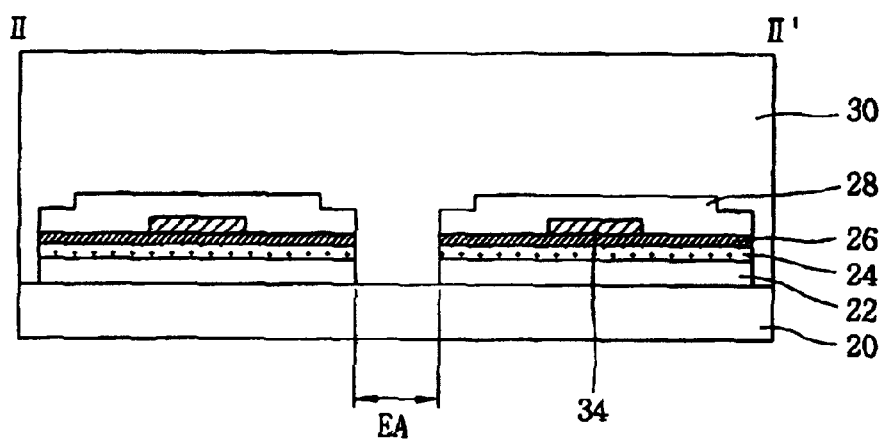
FIG. 5 is a cross sectional view along II–II' of the sealant region in FIG. 2 according to the related art.
Figure 6:
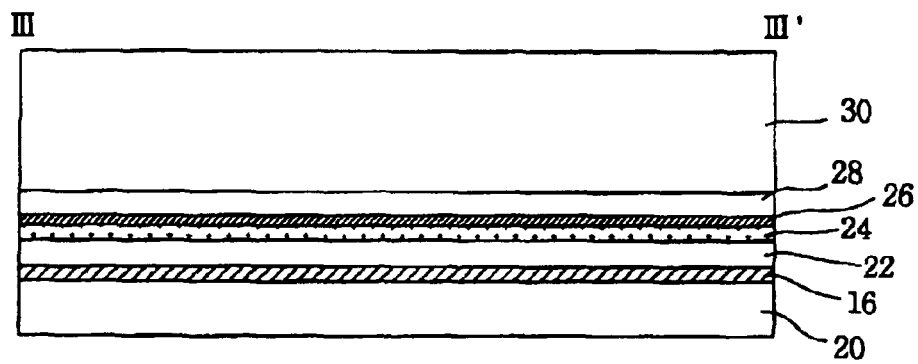
FIG. 6 is a cross sectional view along III–III' of a liquid crystal injecting side in FIG. 1 according to the related art.
Figure 7:
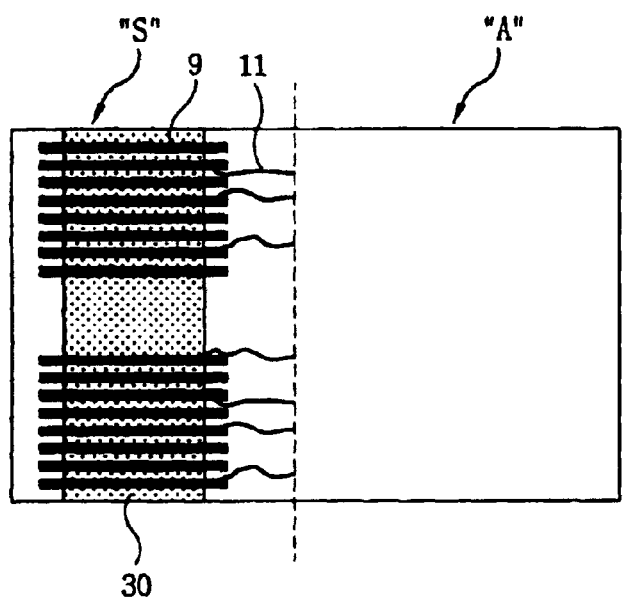
FIG. 7 is a plan view of a liquid crystal display device according to the related art.
Figure 8:
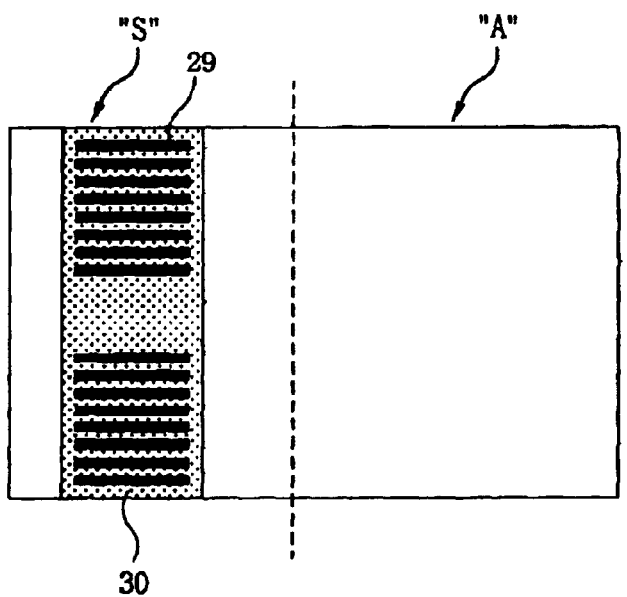
FIG. 8 is a plan view of an exemplary dummy pattern formed in a sealant region according to the present invention.

FIG. 8 is a plan view of an exemplary dummy pattern formed in a sealant region according to the present invention. In FIG. 8, a dummy pattern 29 may be formed within a sealant region "S" that may be formed along a perimeter of an active region "A," wherein the dummy pattern 29 may have a width smaller than a width of the sealant pattern 30. Accordingly, a uniform cell gap of a liquid crystal display panel may be formed, wherein the dummy pattern 29 may be formed among gate link portions and data link portions.

Figure 9A:
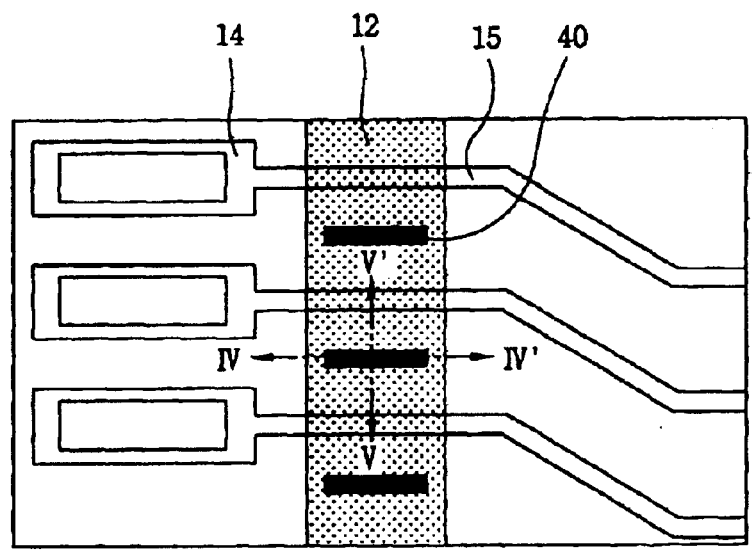
FIG. 9A is a partially enlarged view of an exemplary gate link region according to the present invention.
Figure 9B:
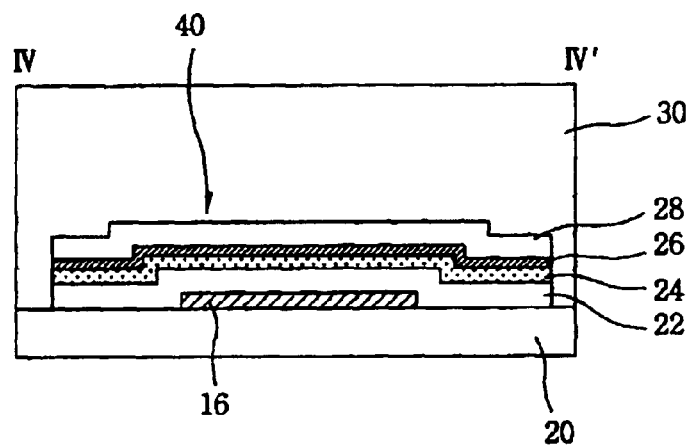
FIG. 9B is a cross sectional view along IV–IV' of a sealant region in FIG. 9A according to the present invention.
Figure 9C:
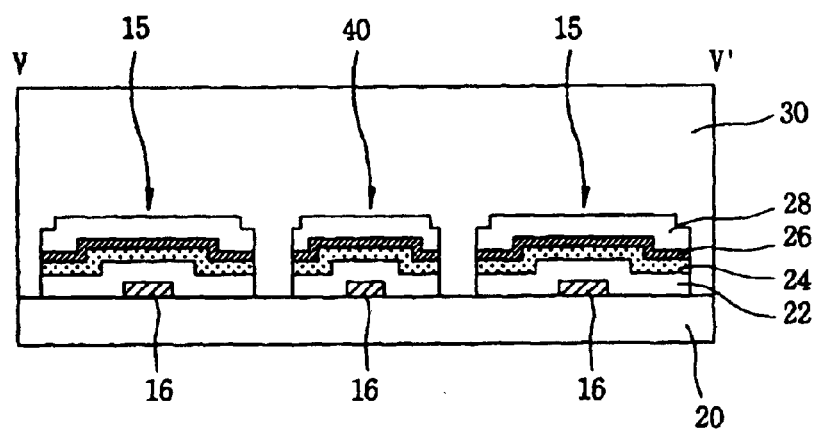
FIG. 9C is a cross sectional view along V–V' of FIG. 9A according to the present invention.

FIG. 9A is a partially enlarged view of an exemplary gate link region according to the present invention, FIG. 9B is a cross sectional view along IV–IV' of a sealant region in FIG. 9A according to the present invention, and FIG. 9C is a cross sectional view along V–V' of FIG. 9A according to the present invention. In FIGS. 9A, 9B, and 9C, a plurality of dummy patterns 40 may be formed within an etching region among gate link portions 15, wherein a width of the dummy patterns 40 may be smaller than a width of a sealant pattern 30. For example, the width of the dummy patterns 40 may be formed to be smaller than about ¾ of the width of the sealant pattern 30. Accordingly, the sealant pattern 30 may be formed to completely cover the dummy patterns 40 to prevent the sealant pattern 30, which may not be hardened, from flowing into an active region through the dummy patterns 40.

In FIG. 9B, the dummy patterns 40 may be completely buried inside the sealant pattern 30 so that the dummy pattern 40 may not function as a passageway to allow unhardened sealant material from flowing into the active region.

In FIG. 9C, the dummy patterns 40 may have a vertical structure identical to the gate link portions 15. For example, each of the gate link portions 15 and dummy patterns 40 may include a gate insulating layer 22, which is deposited on a transparent substrate 20, an amorphous silicon layer 24, an n+ layer 26, a gate metal layer 16, and a passivation layer 28. Accordingly, a stepped portion between the gate link portions 15 may be reduced by the dummy patterns 40. Thus, a uniform cell gap may be formed between upper and lower substrates by the sealant pattern 30.

Figure 10A:
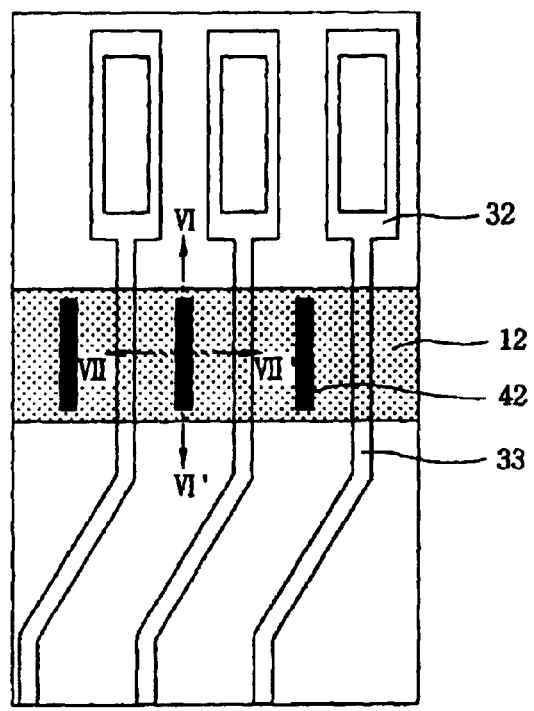
FIG. 10A is a partially enlarged view of an exemplary data link region according to the present invention.
Figure 10B:
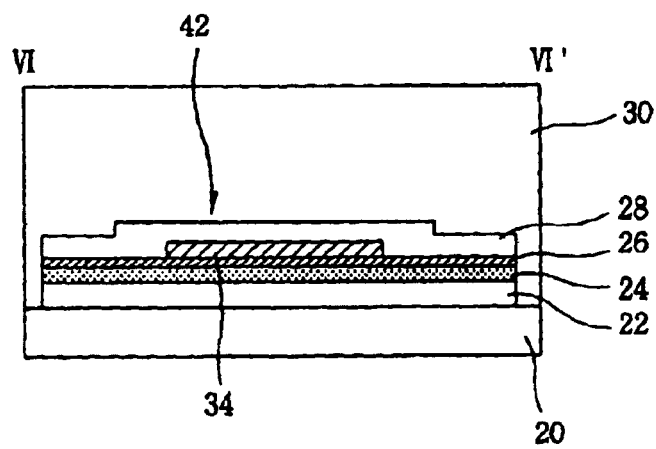
FIG. 10B is a cross sectional view along VI–VI' of FIG. 10A according to the present invention.
Figure 10C:
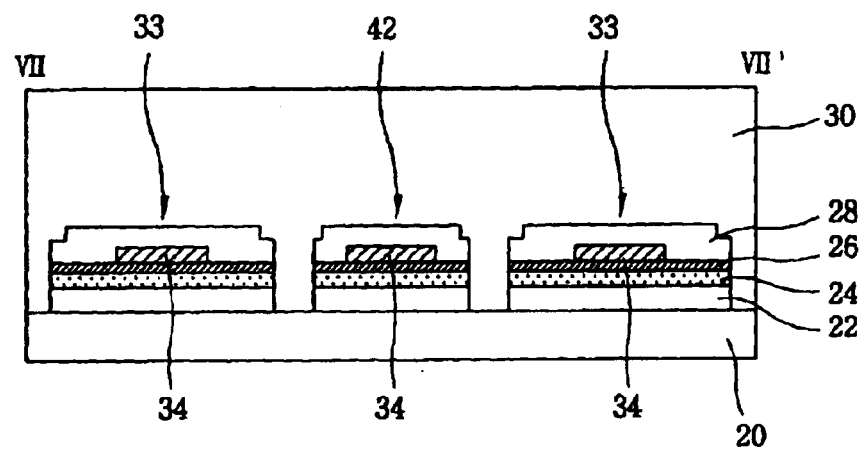
FIG. 10C is a cross sectional view along VII–VII' of FIG. 10A according to the present invention.

FIG. 10A is a partially enlarged view of an exemplary data link region according to the present invention, FIG. 10B is a cross sectional view along VI–VI' of FIG. 10A according to the present invention, and FIG. 10C is a cross sectional view along VII–VII' of FIG. 10A according to the present invention. In FIGS. 10A, 10B, and 10C, dummy patterns 42 may be formed within a sealant region 12 between adjacent data link portions 33.

In FIG. 10B, each of the dummy patterns 42 may include a gate insulating layer 22, an amorphous silicon layer 24, an n+ layer 26, a data metal layer 34, and a passivation layer 28.

In FIG. 10C, each of the dummy patterns 42 may be formed to have a width smaller than ¾ of a width of a sealant pattern 30. In addition, the dummy patterns 42 may be formed to have an identical interval from the data link portions 33, the sealant pattern 30 may be coated on the data link region with a preferable height, and an inflow of unhardened sealant material of the sealant pattern into a liquid crystal layer formed within an active region through the dummy patterns 42 may be prevented, thereby improving image definition quality.

An exemplary method of fabricating an LCD device according to the present invention will be described with reference to FIGS. 9C and 10C.

In FIGS. 9C, gate metal material(s) may be deposited on a transparent substrate 20. Then, the gate metal material(s) may be patterned to form gate lines that may extend through the gate pad portions 14 (in FIG. 9A) and the gate link portions 15. Next, the gate metal layer 16, which is included in the dummy pattern 40 of the gate link region, may be formed. Next, a gate insulating layer 22 may be formed on the transparent substrate 20 and on the gate metal layer. Then, an ohmic contact layer of a TFT may be formed by patterning an n+ layer 26 and an amorphous silicon layer 24 formed on the gate insulating layer 22.

In FIG. 10C, a data line may be formed to extend through a data pad portion 32 (in FIG. 10A) and data link portion 33 by patterning data electrode material(s) deposited on an n+ layer 26, wherein a data metal layer 34 that is included in the dummy pattern 42 of the data link region may be formed. Then, a passivation layer 28 may be formed over an entire surface of a transparent substrate 20. Next, the passivation layer 28, an n+ layer 26, an amorphous silicon layer 24, and a gate insulating layer 22 may be patterned to expose a portion of the transparent substrate 20 to prevent electrical shorting and interaction among gate metal layers 16 and data metal layers 34 by the amorphous silicon layer 24 and the n+ layer 26.

Accordingly, the gate and data link portions 15 and 33 and the dummy patterns 40 and 42 may be formed on the transparent substrate 20, as shown in FIGS. 9B and 10B. In addition, both ends of the dummy patterns 40 and 42 may be formed inside the sealant pattern 30. For example, a width of the dummy pattern 40 may be formed smaller than about ¾ of a width of the sealant pattern 30. Then, after depositing transparent electrode materials, pixel electrodes and the like may be formed by patterning, and by coating the sealant pattern 30 along the gate link regions, data link regions, and the liquid crystal injecting side of the opposite side with a predetermined height to be attached with an upper substrate, thus to forming a uniform cell gap. The LCD device may be completed by injecting liquid crystal material after spraying spacers and attaching the upper and lower substrates together and sealing the liquid crystal injecting side.

According to the present invention, by inserting the dummy patterns among the gate link portions and data link portions, the sealant pattern may be provided in the gate and data link regions having identical heights as that of the liquid crystal injecting side, which is positioned at the opposite side of the data and gate link portions. In addition, by forming the dummy pattern to overlap the inside of the sealant pattern, inflow of unhardened sealant material through the dummy patterns may be prevented. Accordingly, generation of spots on a display panel may be reduced by preventing reaction between the sealant material and the liquid crystal material.

It will be apparent to those skilled in the art that various modifications and variations can be made in the liquid crystal display device and method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates having an active region, data and gate pad portions, and gate and data link portions;
   a sealant pattern within a sealant region;
   at least one first dummy pattern provided between adjacent ones of the gate link portions;
   at least one second dummy pattern provided between adjacent ones of the data link portions; and
   a liquid crystal layer between the first and second substrates,
   wherein a width of each of the first and second dummy patterns is less than a width of the sealant pattern.

2. The device according to claim 1, wherein the width of the first and second dummy patterns are each less than about ¾ of the width of the sealant pattern.

3. The device according to claim 1, wherein each of the gate link portions comprise:
   a gate metal layer on the first substrate;
   a gate insulating layer on the gate metal layer;
   a semiconductor layer on the gate insulating layer; and
   a passivation layer on the semiconductor layer.

4. The device according to claim 1, wherein each of the data link portions comprise:

a gate insulating layer on the first substrate;

a semiconductor layer on the gate insulating layer;

a data metal layer on the gate insulating layer; and a passivation layer on the data metal layer.

5. The device according to claim 1, wherein the first dummy pattern comprises:

a gate metal layer on the first substrate;

a gate insulating layer on the gate metal layer;

a semiconductor layer on the gate insulating layer; and a passivation layer on the gate insulating layer.

6. The device according to claim 1, wherein the second dummy pattern comprises:

a gate insulating layer on the first substrate;

a semiconductor layer on the gate insulating layer;

a data metal layer on the gate insulating layer; and a passivation layer on the data metal layer.

7. The device according to claim 1, wherein a height of the gate link portions and a height of the data link portions are substantially the same.

8. A method of fabricating a liquid crystal display device, comprising:

providing first and second substrates having an active region, gate and data link portions, and a sealant region;

forming a first dummy pattern within the sealant region between adjacent ones of the gate link portions;

forming a second dummy pattern within the sealant region between adjacent ones of the data link portions;

forming a sealant pattern within the sealant region to cover the first and second dummy patterns; and attaching the first and second substrates.

9. The method according to claim 8, wherein forming the first dummy pattern includes:

forming a gate metal layer on the first substrate;

forming a gate insulating layer and a semiconductor layer on the gate metal layer; and forming a passivation layer on the semiconductor layer.

10. The method according to claim 8, wherein forming the second dummy pattern includes:

forming a gate insulating layer and a semiconductor layer on the first substrate;

forming a data metal layer on the semiconductor layer; and forming a passivation layer on the semiconductor layer.

11. The method according to claim 8, wherein widths of the first and second dummy patterns are less than about ¾ of a width of the sealant pattern.

12. The method according to claim 8, wherein each of the gate link portions comprise:

a gate metal layer on the first substrate;

a gate insulating layer on the gate metal layer;

a semiconductor layer on the gate insulating layer; and a passivation layer on the semiconductor layer.

13. The method according to claim 8, wherein each of the data link portions comprise:

a gate insulating layer on the first substrate;

a semiconductor layer on the gate insulating layer;

a data metal layer on the gate insulating layer; and a passivation layer on the data metal layer.

14. The method according to claim 8, wherein a height of the gate link portions and a height of the data link portions are substantially the same.

* * * * *